Dec. 31, 1929.  W. E. BAKER ET AL  1,741,141
FLUID PRESSURE ENGINE
Filed Jan. 18, 1926   2 Sheets-Sheet 1

Fig. 1

Inventors:
William E. Baker
and Richard C. Aland.
By Wm. A. Belt, Atty.

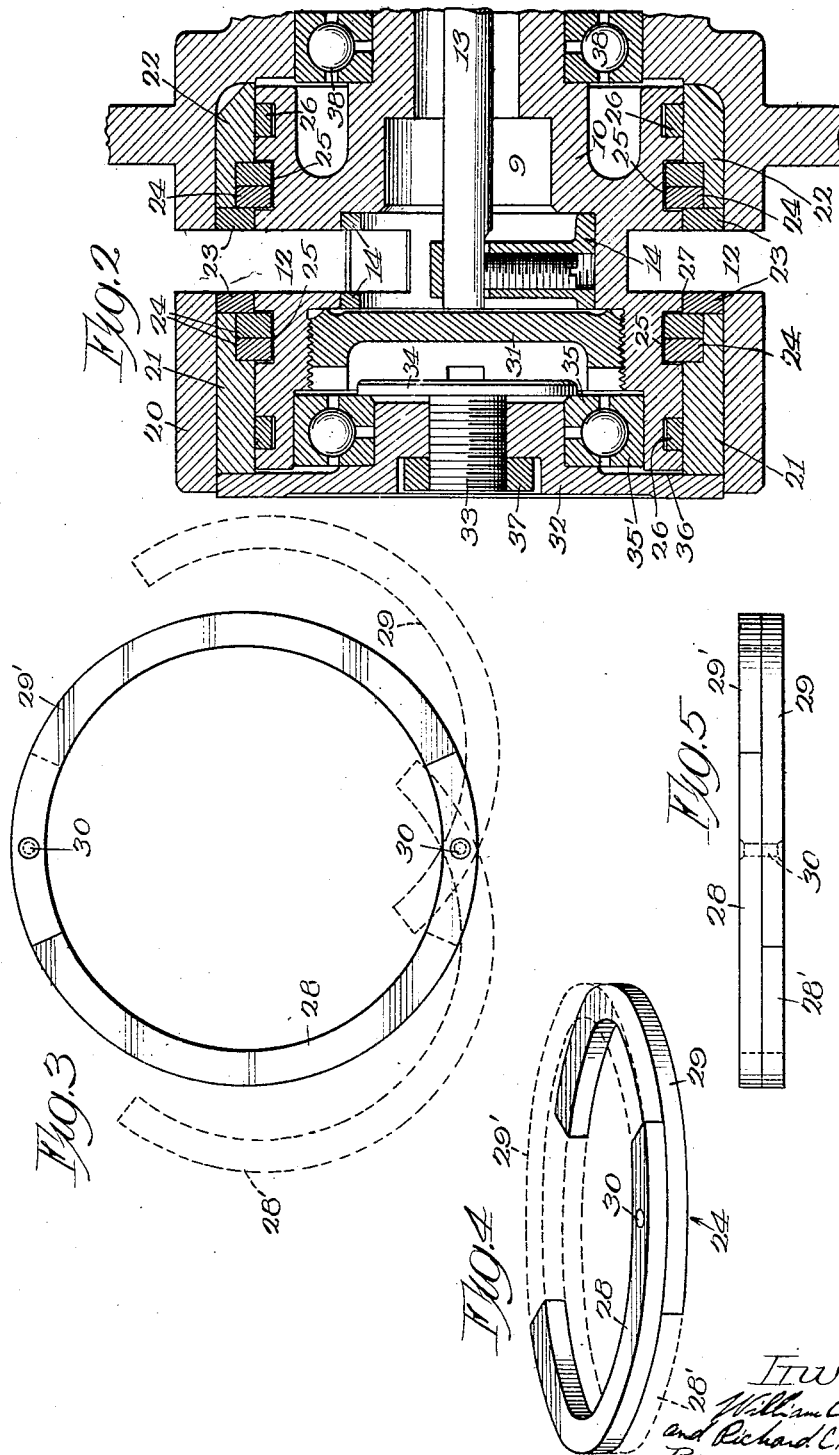

Patented Dec. 31, 1929

1,741,141

UNITED STATES PATENT OFFICE

WILLIAM E. BAKER AND RICHARD C. ALAND, OF CLEVELAND, OHIO, ASSIGNORS TO WILLIAM EDGAR BAKER AND GEORGE ALTON FRANTZ, TRUSTEES OF THE WEB ENGINEERING COMPANY, OF CLEVELAND, OHIO

FLUID-PRESSURE ENGINE

Application filed January 18, 1926. Serial No. 81,965.

This invention relates to improvements upon the type of fluid pressure engine shown in patents to William E. Baker No. 1,391,446 granted September 20, 1921 and No. 1,552,193 granted September 1, 1925. In this type of engine steam is supplied to cylinders mounted upon a rotor, the pistons in said cylinders acting upon a fixed eccentric or the like to cause rotation of the pistons and consequently of the rotor. The steam supplied to the cylinders must obviously pass through a stationary part of some kind and efficiency is lost due to escape of steam along the line formed between the stationary part and the rotor.

Therefore one of the principal objects of our invention is to provide novel and improved means for preventing leakage of steam along the aforesaid line between the rotor and the stationary part. This is achieved by providing rings which rotate with the rotor, but which are held out of engagement with the stationary part, the rings and the stationary part having a running fit which provides insufficient room for the escape of steam. Two parts one of which is movable with respect to the other and which have a running fit will normally prevent the escape of steam or other fluid therebetween until wear begins. We therefore so construct our device that wear is altogether avoided and therefore a tight joint is assured.

A further object of our invention is to provide an improved arrangement of parts which will permit the power to be taken off the other end of the engine than that shown in the aforesaid patents to William E. Baker. By so doing it is possible to employ our engine in many locations wherein it is not now possible to use the same, as will be more fully pointed out as the description progresses. Other advantages also attend upon this arrangement which will be more fully described in detail and will be evident from that description.

Still further objects of our invention are to provide an improved manner of mounting the rotor in the casing; to provide a unitary assembly of the valve and associated parts whereby the same may be assembled and then may be inserted in and withdrawn from the engine as one unit, and to provide an improved compact arrangement of elements which will permit the use of the engine in situations where space is limited.

In the accompanying drawings in which we have shown a selected embodiment of our invention:

Fig. 1 is a longitudinal sectional view through our invention as used in connection with an engine of the type referred to.

Fig. 2 is a view on an enlarged scale of the inner end of the steam chest cover and the parts contained therein.

Fig. 3 is a plan view of a pair of the rings which we employ with our invention.

Fig. 4 is a perspective view of one of said rings and

Fig. 5 is an elevation of the two rings shown in Fig. 3.

Referring now to the drawings in detail, the engine is received within a casing 1 and comprises a rotor designated generally as 2 and which consists of a plurality of cylinders 3 within which are received pistons 4 which react upon the crank shaft 5, this crank shaft being secured to the casing in any suitable manner at 6. Steam is supplied to the cylinders from any suitable source through a pipe 7 which is connected to the stem 8 of the valve body. As plainly shown in Fig. 1, this body is provided with a central bore through which the steam passes and enters the chamber 9 in the valve body 10, from which it passes to the intake tubes 11 through suitable ports 12. Passing centrally through the bore in the stem 8 is a shaft 13 which is connected at its end in the chamber 9 to the cutoff plate 14 by means of which the passage of steam to the ports 12 is regulated. The above shaft 13 may be rotated by any suitable means such as a lever 15 which is shown in section in Fig. 1.

The operation of an engine of this type is known in the art and has been set forth in the aforesaid patents to William E. Baker. It may be briefly stated, however, that as the steam enters the cylinders 3, which action takes place progressively, one cylinder after the other, the reaction of the steam in the respective cylinders causes the rotation of the rotor of which the cylinders form a part. The cutoff plate 14 may be rotated to control the point of cut-off, in a manner well known in the art.

The rotor proper terminates in a recess 16 within which is received the valve body. The valve body is supported in a steam chest cover 17 which is secured to the rotor by bolts 18 or other suitable fastening means whereby it may be readily detached therefrom, it being understood that the intake tubes 11 terminate at the surface of the recess 16 so that the steam chest cover may be slid in and out of the recess. It will be noted that the steam chest cover is of elongated form so as to surround the valve body stem 8 and to receive therein the entire valve body. Suitable packing 19 is provided between the valve body stem and the steam chest cover.

Between the valve body 10 and the valve cage 20 formed by the wall of the inner end of the steam chest cover is disposed a bushing which is shown in Fig. 1 and more plainly shown in the enlarged view of Fig. 2. This bushing is made in three pieces, the rings 21, 22 and 23, the ring 23 being apertured to permit passage of steam through the ports 12. The rings 21 and 22 are recessed as shown to receive specially constructed rings 24. While we have shown these rings as being placed in a recess at the inner edge of the rings 21 and 22 respectively, nevertheless it is to be understood that this recess may be placed at any other desired point. It will be noted that the rings fit tightly within these recesses and that they have a running fit in recesses 25 in the valve body 10. By the expression "running fit" we mean that there is a slight clearance between the rings and the walls of the recess so that at no time and at no place do the rings touch these walls of the recess 25. The rings 21, 22 and 23 fit tightly into place in the valve cage and revolve therewith, and in effect form a part thereof. A thin film of oil fills the space between the rings and the walls of the recess and effectually prevents passage of steam through this space. It will be seen that no wear on the rings is possible and as stated above so long as wear is prevented leakage is also avoided.

The valve body is further provided with recesses spaced on either side of the rings 24 and receiving piston rings 26 of usual construction. These rings are not absolutely necessary to prevent leakage, but are provided as an additional precaution. It will then be seen that steam passing through the ports 12, in order to leak out between the moving and stationary parts, at 27 for example, must follow the circuitous path around the rings 24 and then must also pass the ring 26. As pointed out above the passage of steam by the rings 24 is effectively prevented and from actual tests which we have made we have found that substantially no steam succeeds in following this path. This result we ascribe to the fact that wear on the rings is effectively prevented, and such wear is prevented by the fact that the rings are securely held in the bushing formed of the rings 21, 22 and 23 and these rings in turn are held securely in place, as will be obvious from an inspection of the drawings. It is impossible for the steam pressure to force the rings 24 against the walls of the recesses 25, and thus produce wear of the rings.

In order to provide a structure which may be easily placed in position and which shall afford no gaps for the passage of steam therethrough, we formed the rings 24 in the manner best shown in Figs. 3, 4 and 5. Referring to these figures it will be seen that each ring is made up of two substantially semicircular portions 28 and 29, these portions being overlapped adjacent one end and riveted lightly together at 30. By this means a hinged construction is formed which permits the rings to be placed in position readily by movement in a plane transversely of the valve body. That is, they do not have to be slid over the end of the body and this feature is very important when it comes to assembling the device, as will be obvious to workers in this art. As plainly shown in the drawings the rings 24 are arranged in pairs. The ring which co-operates with that shown in full lines in Fig. 4 is identical in form, but is placed in reverse position thereto so that the part 29' corresponding to the part 29 rests thereupon and the part 28' corresponding to the part 28 is received beneath that part, as shown in dotted lines in Fig. 4. The result is a structure formed of two rings with overlapping joints so that there is substantially no chance of steam leaking by any joint and then the pair of rings is placed in the recess in the bushing as described above, in which recess it is held snugly in place and the two rings of each pair are held closely together. At the same time these rings may be readily removed if desired. The manner in which the two parts of each ring may be pulled apart is shown in dotted lines in Fig. 3. Not only are the joints staggered, but it will be obvious that the efficiency of the joint is greatly increased by the fact that the two parts of each ring overlap for a considerable distance and are held in close engagement by means of the rivet 30.

The valve chamber 9 is closed by a plug 31, which plug is made tight by being provided with the high pressure joint described and claimed in the co-pending application of William E. Baker, Serial No. 70,471, filed November 22, 1925, and the structure thus formed co-operates with the arrangement of rings and bushing to decrease the leakage of steam to a minimum.

The end of the valve cage is closed by a member 32 secured in place by a bolt 33, the head 34 of which engages the race 35 forming part of the bearing between the valve body and the cage. It will be noted that a certain clearance 36 is provided between the member 32 and the body 10 and by tightening the nut 37 on the bolt 33, the member 32 is brought into tight engagement with the bushing 21 and cage 20 and will rotate therewith. It will, of course, be understood that the race 35' is secured to the body 10 in any suitable manner to rotate therewith so that the cage may revolve freely about the valve body and so that the valve body itself may be rotated independently of the cage, which is done when the engine is reversed as set forth in the aforesaid patents of William E. Baker. Other suitable bearings 38 are also provided between the valve cage and the valve body and for the same purpose as the bearings just described.

The revolving parts including the rotor, the valve cage, and the steam chest cover, are supported in the casing 1 by the two bearings 40 and 41, each bearing comprising a race supported on the casing and another race on the revolving parts. When it is desired to disassemble the various parts, it will be obvious that this may be readily done by removing the gear casing 42 and then, after removal of the bolts 18 the entire valve structure may be slid bodily out of position as a unit. It will also be noted that the bearing between the valve body and the valve cage is independent of the engine casing and therefore a more accurate fit can be achieved than if this bearing were located partly upon the casing of the rotor, as has been common practice hitherto.

Secured to the steam chest cover 17 is a gear 43 disposed in the gear casing 42 and meshing with a pinion 44 upon the drive shaft 45. Power may be taken off from the shaft 45 in any suitable manner exemplified by the gear 46 and gear 47 on the shaft 48. By providing means for use of the gear 43 on this end of the engine it is possible to employ a smaller gear than if the other end of the engine be used as the one from which the power is taken. This is due to the fact that if power were taken from the other end the rotor itself must be used and because of the size of the rotor at the other end obviously a large gear must be employed.

Moreover, by the arrangement shown, the generator which supplies steam to the engine may be placed directly against the left end of the engine as viewed in Fig. 1, a construction which is not possible when the power is taken off from that end. When the generator and engine are placed in this relation, as in a vehicle, then the controls such as the throttle valve and reversing lever are disposed to the right of the engine, as viewed in Fig. 1 which is obviously much more convenient and practical than if they had to be disposed upon the opposite end from that at which the valve is located. It will also be evident that, in a vehicle for example, the steam generator used with this engine may be placed under the hood and that the power takeoff is conveniently located for operative connection with the means for driving the vehicle.

Again by employing the steam chest cover as a shaft to carry a gear we provide a longer stuffing box within the steam chest cover for the packing 19. While, as stated above, it is practically impossible for steam to leak from the valve chamber and to reach the packing, nevertheless this arrangement provides an additional precaution which is, of course, valuable in case of any unforeseen emergency.

From the above it will be apparent that we have provided a fluid pressure engine of novel and improved construction wherein the efficiency of the engine is greatly increased by the prevention of steam leakage. The engine is also improved in the general arrangement of parts whereby a structure is provided which may be placed with the left end, as viewed in Fig. 1, directly against a steam generator so that the other end of the engine will be accessible to the necessary controls and so that the power may be taken from said other end. Furthermore, by the arrangement of the valve cage and body it will be evident that the body does not support the cage, the cage being supported entirely upon the bearings as described. The surface of contact between the body 10 and the bushing formed by the rings 21, 22 and 23 takes no weight at all, and therefore wear at this point is minimized. This feature is important because of the fact that this surface of contact is the one along which steam would naturally escape. Therefore, by avoiding wear on this surface and also by spanning the surface with the rings 24 in the manner described, the chance of leakage is effectively eliminated.

As pointed out above the valve may be assembled in place in the valve cage and then slipped as a unit into the recess 16. When the bearing 41 is placed in position the entire structure is then supported on the bearings 40 and 41. The gear casing 42 may be readily attached to the main casing and this gear casing may support the drive shaft 45 in suitable bearings, thus making a very compact efficient arrangement of parts.

We are aware that changes in the form, construction and arrangement of parts may be made without departing from the spirit and without sacrificing the advantages of the invention and we consider ourselves entitled to make all such changes as fairly fall within the scope of the following claims.

We claim:

1. In a device of the class described, a stationary element and an element rotatable in respect thereto, one of said elements having a port by means of which steam is adapted to pass through an aperture in the other of said elements and a ring spanning the surface of contact between said elements, said ring being carried by the rotatable element and received within a recess in the other and spaced from the walls of said recess.

2. In a device of the class described, a valve body, a valve cage surrounding said body and rotatable in respect thereto, said valve body having a port by means of which steam is adapted to pass through an aperture in said cage and a ring spanning the surface of contact between said body and said cage, said ring being carried by and rotatable with said cage and received within a recess in said body and spaced from the walls of said recess.

3. In a device of the class described, a stationary element, and an element rotatable in respect thereto, one of said elements having a port by means of which steam is adapted to pass through an aperture in the other of said elements, and a ring spanning the surface of contact between said elements, said ring being formed in two parts having their ends overlapped, said ring being carried by one of said elements and received within and spaced from the walls of a recess in the other.

4. In a device of the class described, a valve body having ring receiving recesses, a valve cage having corresponding ring receiving recesses and surrounding said body and rotatable in respect thereto, said valve body having a port by means of which steam is adapted to pass through an aperture in said cage, and a pair of rings spanning the surface of contact between said elements, each ring being formed in two parts and positioned in the corresponding recesses in the value body and cage and having their ends overlapped, the rings of the pair being placed with their respective parts in reverse relation to each other, said pair of rings being secured in the recesses in said cage to rotate therewith and spaced from the walls of the recesses in said body.

5. In a device of the class described, a valve body having ring receiving recesses, a cage surrounding said body and rotatable relatively thereto, a bushing disposed between said body and cage and rotatable with the cage, an intermediate ring mounted in said bushing in contact with said body and having apertures, said body having a port adapted to register with said apertures in the intermediate ring, and a pair of rings on each side of said intermediate ring, each ring being formed in two parts with their ends overlapped and the rings of each pair being placed with their respective parts in reverse relation to each other, and each pair of rings being secured to its respective recesses in said bushing and positioned in the corresponding recesses in the body out of contact with the walls thereof.

6. The combination of a valve body having annular ring receiving recesses, a cage surrounding said body and rotatable relatively thereto and having annular ring receiving recesses registering with the recesses in the body, a pair of rings secured in each cage recess to rotate with the cage and extending into but spaced from the walls of the corresponding body recesses, and an intermediate ring mounted in said cage in engagement with the pairs of rings and contacting the periphery of the body.

WILLIAM E. BAKER.
RICHARD C. ALAND.